Nov. 6, 1934.  O. J. LEINS  1,979,332
LIGHTING DEVICE
Filed May 5, 1930  2 Sheets-Sheet 1
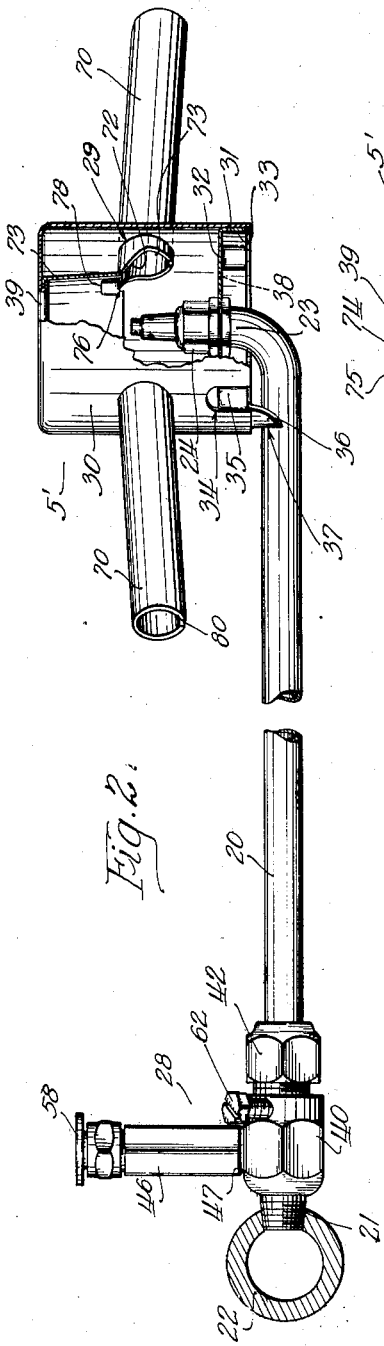
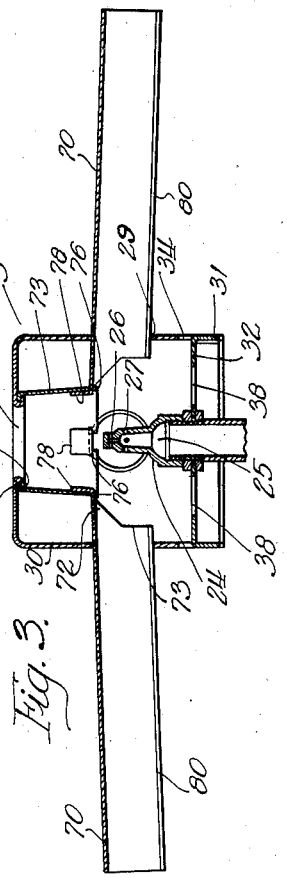
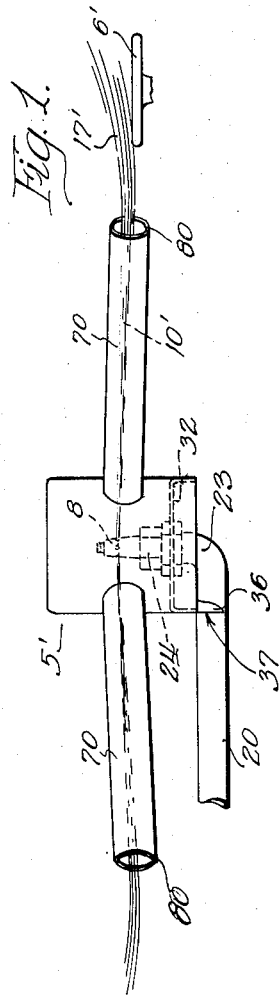
Inventor
Oscar J. Leins.
By Brown, Jackson, Boettcher & Dienner
Attys.

Nov. 6, 1934.  O. J. LEINS  1,979,332
LIGHTING DEVICE
Filed May 5, 1930   2 Sheets-Sheet 2
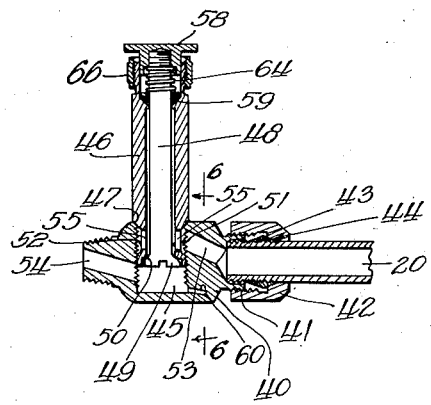
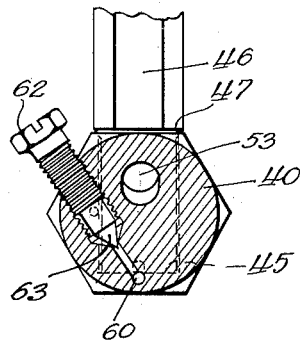
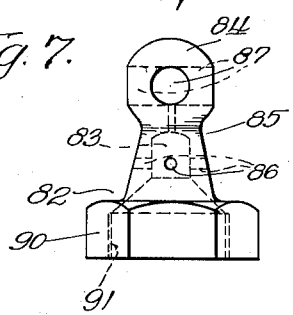
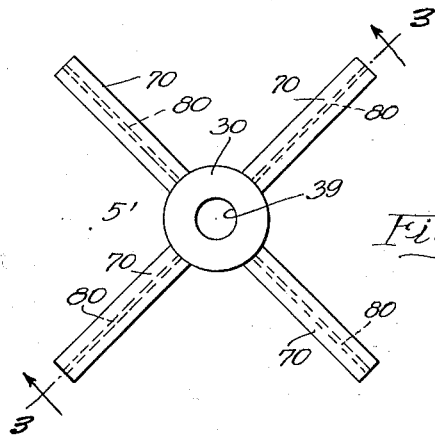
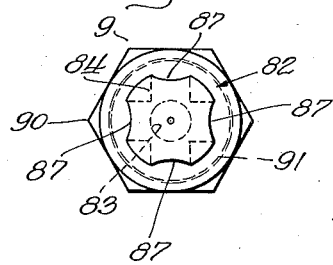
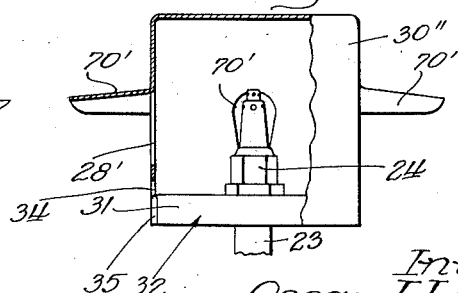
Inventor.
Oscar J. Leins.
By Brown, Jackson, Boettcher & Dienner
Attys.

Patented Nov. 6, 1934

1,979,332

UNITED STATES PATENT OFFICE 1,979,332

LIGHTING DEVICE

Oscar J. Leins, Milwaukee, Wis., assignor to Milwaukee Gas Specialty Company, Milwaukee, Wis., a corporation of Wisconsin Application May 5, 1930, Serial No. 449,854

6 Claims. (Cl. 158—115)

This invention relates to lighting devices and its primary object is to enable the use of gases with relatively high heating or B. t. u. values.

Lighting devices of the general type to which my invention relates are commonly employed for lighting the burners of gas stoves or ranges, although it is to be understood that the device may be employed for lighting other objects. They usually provide for constantly maintaining a pilot light at the lighter, and for projecting the lighting flame or flames from the lighter toward the burner or other object, the fuel for the lighting flame being supplied to the lighter independently of the burner and independently of the path of the lighting flame.

The heating or B. t. u. values of the manufactured gases with which these lighting devices have been commonly employed are usually of the order of from 500 to 600 B. t. u. per cubic foot. Where the heating or B. t. u. value is higher the flame temperature is higher, and where the flame temperature becomes relatively high there is a distinct tendency for the outer end of the lighting flame to curve or rise upwardly away from the burner toward which it is projected. Where the heating or B. t. u. value of the gas is relatively high the outer end of the lighting flame curves or rises upwardly away from and misses the burner.

Lighting devices, of the type to which this invention relates, have been provided with adjustments for the pilot light and for the lighting flame or flames. Where natural gas has been used, which usually has a B. t. u. value of the order of from 900 to 1100 B. t. u. per cubic foot, it has been previously proposed to adapt these lighters to use with such gas by means of these pilot and flame adjustments.

Gases of considerably higher B. t. u. values are, however, now frequently encountered, particularly combustion arrangements of gases derived from the paraffin, olefine, acetylene and aromatic series of gases and/or liquids, the B. t. u. values of which are usually of the order of from 1500 to 3500 B. t. u. per cubic foot or higher. There is such a gas which is commonly referred to as a "bottled" gas and is commonly used by persons not desiring to use oil in places which are remote or away from communities. Because of its relatively high B. t. u. value, and its high flame temperature, lighting devices of the type to which this invention, in its more specific aspects, is directed, have been unsuitable for use therewith. The flame temperature is relatively high and the upward curve or rise of the outer end of the lighting flame is so great that the outer end of the flame misses the burner or object to be lighted completely. The present type of lighter does not function successfully with gases having high calorific values.

The primary object of the present invention is to adapt the lighter so that it will be suitable for use with these gases of relatively high heating or B. t. u. value.

Another and more specific feature of the present invention is in the means for enabling this.

Another more specific aspect is to provide means which may be applied to existing lighters and to enable the avoidance of material changes in the lighter.

Another more specific aspect resides in the provision of a flame projecting arrangement which is operable to reduce the upward rise or deflection of the outer end of the lighting flame.

The present invention is not limited to use with the burners of gas stoves or ranges, nor is its utility confined to the particular high flame temperature gases above referred to.

The invention is illustrated in the accompanying drawings, in which:

Figure 1 is a view showing an embodiment of the present invention;

Figure 2 is an enlarged side elevational view of the lighter shown in Figure 1, partially broken away and partially in section;

Figure 3 is a sectional view through the lighter tip, hood and flame projecting arrangement taken on the line 3—3 of Figure 4;

Figure 4 is a plan view of the lighter hood and flame projecting arrangement;

Figure 5 is an enlarged vertical section through the valve mechanism.

Figure 6 is a transverse section through the valve mechanism on the line 6—6 of Figure 5;

Figure 7 is a side elevational view of a lighter tip constructed to keep the gas issuing from the flame projecting ports ignited at all times;

Figure 8 is a plan view of the tip shown in Figure 7; and

Figure 9 is a side elevational view of a lighter hood showing another embodiment of the present invention.

In the existing type of lighter and burner arrangement, the lighter is usually provided with an upturned end having a tip provided with a port for maintaining a pilot light at the lighter and for projecting the pilot light or flame to the burner to be lighted. The tip portion of the lighter is usually provided with a hood having apertures therein through which the flame may be projected. It is understood, of course, that in cases where there are a plurality of burners, the lighter is so arranged that the flames are projected through a plurality of ports directed toward each of the burners.

The arrangement is a simple and highly satisfactory arrangement for fuels of relatively low heating value, and by fuels of relatively low heating value I have reference particularly to the commonly employed manufactured gases having heating or B. t. u. values of the order of 500 to 600 B. t. u. per cubic foot and to the natural gases as heretofore employed and which have heating or B. t. u. values of the order of 900 to 1100 B. t. u. per cubic foot.

Hereinafter where I refer to fuels having relatively high heating or relatively high B. t. u. values, I have reference to any fuel with a heating or B. t. u. value sufficiently high to produce a lighting flame with a temperature and buoyancy such that the outer end of the flame will miss the burner, and more particularly to fuels with a heating or B. t. u. value higher than the heating or B. t. u. values of the relatively low heating value fuels referred to in the preceding paragraph. Still more particularly I have reference to combustion arrangements of gases derived from the paraffin, olefine, acetylene and aromatic series of gases and/or liquids and equivalent fuels, the heating or B. t. u. value of which is usually of the order of 1500 to 3500 B. t. u. per cubic foot or higher. Reference to relatively high and relatively low heating or B. t. u. value fuels as used herein is therefore for the purpose of differentiating between a fuel having a heating or B. t. u. value suitable for use with existing lighter and burner arrangements, and fuels with heating or B. t. u. values not suitable for use with existing lighter and burner arrangements.

Where a fuel of relatively high heating or B. t. u. value is employed with the present type of burner and lighter arrangement, the high flame temperature resulting from the high heating or B. t. u. value of the fuel produces a distinct tendency for the lighting flame to rise upwardly. The pressure under which the lighting flame is projected directs the flame outwardly, but as the force of projection decreases or is spent toward the outer end of the flame this outer end curves or rises upwardly away from the burner toward which it is projected with the result that the outer end of the flame misses the burner or other object to be lighted completely and fails to perform its lighting function.

Now in order to permit the use of a fuel of relatively high heating or B. t. u. value and particularly a fuel such as previously described, or its equivalent, I provide for checking the rising tendency of the lighting flame to prevent the outer end of said flame from missing the burner due to the high temperature of the flame.

Referring now to Figures 1 to 8, inclusive, the lighter is designated generally at 5' and comprises the lighter tube 20 connected at one end at 21 with the fuel supply pipe 22 which may be the stringer pipe disposed along the stove and connected to the respective burners 6', for supplying fuel thereto, or any other fuel supply pipe. The opposite end of the tube 20 is turned up at 23 and threaded thereon is a lighter tip 24 comprising a body portion preferably of brass or other suitable metal provided with an internal passage 25 for receiving the fuel for maintaining the pilot light at the lighter, and for projecting a lighting flame from the lighter. The tip 24 has a lower series of ports 27, one directed toward each burner, and a series of upper ports 26, one above each port 27, there being four of said ports in each series, in the embodiment shown, with the ports of one series in one plane and the ports of the other series in another plane and with one upper port 26 overlying each lower port 27.

The gas issues from the ports in the tip 24 to form a normally burning pilot flame at the upper end of the tip, and by manipulating the valve 28 lighting flames are adapted to be projected from the ports above referred to, passing outwardly through the apertures 29 in the hood 30 and toward the burners 6.

The hood 30 comprises an inverted generally cup-shaped metal stamping with its open lower end in quick detachable telescopic engagement at 31 with disc 32 which may also be a metal stamping and which has a down turned marginal flange 33, there being vertical ribs 35 pressed outwardly in the flange 33 for engagement with vertical notches 34 in the bottom of the hood by aligning the slots 34 with the ribs 35 and slipping the hood vertically over the flange 33. The engagement of the ribs 35 in notches 34 holds the hood against turning on the disc 32, which is secured in place upon the upturned end 23 of the lighter tube 20 by nuts threaded thereon. The disc 32 is held against turning on the upturned end of the tube 20 by a depending tongue 36 having a notch 37 in which the tube 20 engages. The disc 32 has air admission openings 38 and the top of the hood has a concentric opening 39.

The particular valve 28 shown comprises a valve body 40 having an externally threaded nipple at one end for screwing into the supply pipe 22. At the other end is a nipple 41 threaded externally for threaded engagement with a coupling or union nut 42 and bored internally to receive the end of the tube 20 which has a tapered shoulder 43 rigid thereon and engageable with the nut 42 at 44 so that when the nut 42 is threaded up on the nipple 41 the lighter tube 20 will be secured firmly to the valve body, and a tight connection will be provided. The valve body 40 has a well 45 internally threaded to receive the valve cage 46 which screws down into the valve and seats at 47. A valve stem 48 passes downwardly through the cage 46 and has at its lower end a valve head 49, which normally seats against a seat 50 at the lower end of the cage 46, closing communication from the well 45 into the chamber 51 in the cage. Above its lower threaded end the cage 46 is reduced to provide an annular space 52 and a diagonal duct 53 provides outlet communication from the chamber 51 above the seat 50 to the lighter tube 20, whereas an inlet duct 54 provides inlet communication from the supply pipe 22 to the well 45 below the seat 50. Ports 55 open from the chamber 51 to the annular space 52, and the upper end of the stem 48 has a button 58 threaded thereon, a coil spring surrounding the stem 48 and being interposed between the button and the packing indicated at 59 and urging the valve head 49 upwardly yieldingly to its seat 50.

A relatively restricted by-pass passage 60 is provided around the valve head 49 and its cooperating seat 50 for supplying the fuel to maintain the pilot light at the tip 24 when the valve head 49 is seated. An adjusting screw 62 having a tapered inner end 63 is provided for regulating or adjusting the restricted by-pass flow of fuel and thereby the normally maintained pilot.

As well understood, the adjustable restricted by-pass 60 maintains a pilot at the lighter tip and by depressing the button 58 the valve 49 is opened against the spring 64 to increase the supply of fuel to the lighter and to project the lighting flame or flames to the burner or burners 6 or other object to be lighted.

For the purpose of adjusting the amount of opening of the valve 49 when the button 58 is depressed, regulating the volume of the gas for the lighting flame or for obtaining the desired character of flame projection with the various fuel pressures, a sleeve 66 is threaded upon the upper end of the cage 46 in such a manner that by threading the sleeve downwardly upon and upwardly from the cage the projection of the sleeve from the upper end of the cage, and thereby the position of the stop formed by the upper end of the sleeve for the button 58 may be adjusted to vary the movement or opening of the valve 49 as desired.

The foregoing details may all vary widely within the scope of the present invention. The lighting flame and pilot adjustments may be varied or either or both may even be omitted within the broader aspects of the present invention.

It will be apparent from the foregoing that the relatively high temperature lighting flame is projected from the lighter independently of the fuel supply connection for the burner or burners 6', and that the fuel of relatively high heating value is supplied to the lighter independently of the path of the lighting flame.

In the embodiment of Figures 1 to 8 the means for checking the rising tendency of the lighting flame to prevent the outer end of the flame from missing the burner or other object due to the high temperature of the flame comprises a tube or conduit 70 for each lighting flame. These tubes or conduits 70 preferably extend outwardly from the lighter hood 30 and terminate short of the burner or burners 6'.

These tubes or conduits 70 provide obstructions for the lighting flame or flames which obstructions extend outwardly of the hood and along the top of the path of the flame, with the result that by proportioning the obstructions substantially as shown, the rising tendency of the high temperature lighting flame produced by a relatively high heating or B. t. u. value gas will be obstructed sufficiently to prevent the outer end of the flame 10' from missing the burner. The outer end 17' of the flame instead of rising or curving up away from the burner or other object will reach the same and perform its lighting function with the relatively high heating value gas as shown in Figure 1.

In addition to providing for obstructing the rising tendency of the relatively high heating value gases referred to sufficiently to cause the lighting flame to reach the burner or other object, the present invention contemplates correlating the amount of obstruction to the heating or B. t. u. value of the relatively high heating value fuel to obstruct the rising tendency sufficiently to prevent the flow from missing the burner or other object.

The tubes 70, there being four equally spaced tubes 70 in the illustrated embodiment, pass at their inner ends through the openings 29 in the hood 30 and have support in the wall of the hood. The inner ends of the tubes 70 are cut off or shaped so that the upper portions 72 will continue inwardly of the lower portions, and disposed concentrically within the hood is an inner shell 73 open at the top and at the bottom. The margin of the top of the hood around the opening 39 is rolled downwardly and outwardly at 74 around the inturned flange 75 at the upper end of the shell 73 securely binding said flange 75 thereto and supporting the inner shell in position within the hood.

The lower edge of the shell 73 has over-cut notches 76 and the top of the inner end of each tube 70 has an integral tongue 78 struck up from the inner end of the tube and interlocked with the over-cut portions of the notches 76 binding the inner ends of the tubes 70 all together through the shell or ring 73 and firmly supporting the inner ends of the tubes for removal and application as a unit with the quick detachable hood 30.

Each tube 70 is preferably open along the bottom to allow for the entry of air so that the lighting flame will not be choked or extinguished within the tube or hood. These openings may be in the form of slits 80 extending longitudinally of the bottom of each tube 70, as shown, or other forms of openings may be provided in the bottom of the tubes 70 in lieu of these longitudinal slits.

In the embodiment of Figure 9 the obstructions for checking the rising tendency the high temperature lighting flames are formed integral with the hood 30'' by striking these obstructions indicated at 70' out from the wall of the hood. These obstructions 70' again overlie the inner ends of the lighting flames outwardly of the hood and may be of arched section. The apertures 28' through which the lighting flames 10' are emitted may be formed by the striking of these obstructions from the wall of the hood.

In Figures 7 and 8 I have shown a lighter tip constructed to keep the gas issuing from the flame projecting ports ignited at all times. This tip 82 comprises as an article of manufacture a body portion having an internal passage 83 for receiving the fuel for maintaining a pilot light and for projecting a lighting flame. The upper end of the body of the tip has a ball-like or generally spherical enlargement 84 and below this enlargement the body of the tip is reduced at 85. The reduced portion 85 has a plurality of relatively restricted lower ports 86 for projecting relatively long lighting flames from the tip to the burners or other objects, and the enlarged head 84 has a plurality of larger ports 87 disposed in a plane above the plane of the lower ports 86 for projecting relatively short and relatively heavy flames above the plane of the lighting flames to form a relatively short and relatively highly heated area above the lighting flames for keeping the gas issuing from the ports 86 ignited at all times. One of the relatively large ports 87 is shown above each of the relatively restricted ports 86, but it is to be understood that they may be staggered with respect to the ports 86. The ports 26 of the tip shown in Figures 2 and 3 may also be staggered with respect to the ports 27.

It is to be understood, of course, that the lower end of the tip 82 may be threaded internally, to be threaded upon the upturned threaded end 23 of the lighter tube 20, and that the body of the tip adjacent the bottom may be of polygonal or other formation at 90 for engagement by wrench or other tool for screwing the same upon the lighter tube. The internal threads within the lower end of the tip are shown at 91. The tip 82 may be employed in combination with the obstructing tubes 70 in place of the tip 24 shown in Figures 1, 2 and 3.

I claim:—

1. In combination, a burner having a fuel supply connection, a lighter for said burner, a hood for said lighter, means for projecting a lighting flame from the lighter independently of the fuel supply connection for the burner, a conduit extending from the lighter and supported by said hood for obstructing the rising tendency of the lighting flame, and means within said hood for non-rotatively locking the inner end of said conduit against withdrawal from said hood.

2. In combination, a burner having a fuel supply connection, a lighter for said burner, means for projecting a lighting flame from the lighter independently of the fuel supply connection for the burner, a quick detachable hood for said lighter and means having normally extending supporting portions engaging abutting means within said hood, said second named means obstructing the rising tendency of the lighting flame and extending outwardly from the hood along the top of the path of said flame and terminating short of the burner.

3. As an article of manufacture a lighter tip comprising a body portion having an internal passage for receiving the fuel for maintaining a pilot light and for projecting a lighting flame, said body portion having a relatively restricted laterally extending lower port for projecting a relatively long lighting flame from the tip and said body having a relatively large laterally extending port above the plane of said first port for providing a relatively short and sustained heavy flame above the plane of said lighting flame to form a sustaining flame for said lighting flame to keep the latter ignited during its projected period.

4. As an article of manufacture, a lighter tip comprising a body portion having an internal passage for receiving fuel for maintaining a pilot light and for projecting a lighting flame, said body portion having a relatively restricted lower port for projecting a relatively long lighting flame from the tip, and said body portion having a relatively large port for providing a relatively short and sustained heavy flame extending parallel to but above the plane of said lighting flame to form a sustaining flame for said lighting flame to keep the latter ignited during its projected period, said ports being in direct communication.

5. In combination, a burner having a fuel supply connection, a lighter for said burner, a hood for said lighter, a support carried by said lighter for positioning said hood concentrically of the lighter, said hood having a central opening in the top thereof, flue means aligned with said opening, means for projecting a lighting flame from said lighter to said burner, conduits extending outwardly from said lighter through said hood for checking the rise of said lighting flame, and upstanding tongues formed on the inner ends of said conduits and engaging said flue means for non-rotatively supporting said conduits.

6. In combination, a burner having a fuel supply connection, a lighter for said burner, a hood for said lighter, a support carried by said lighter for positioning said hood concentrically thereof, said hood having a central opening in the top thereof, flue means aligned with said opening and having a lower circular edge provided with notches, means for projecting a lighting flame from said lighter to said burner, and conduits extending from and supported by said flue means to a point adjacent said burner for checking the rise of said lighting flame, said conduits having tongues engaging in said notches for preventing rotation of said conduits.

OSCAR J. LEINS.